United States Patent
Arimatsu

(10) Patent No.: US 10,250,089 B2
(45) Date of Patent: Apr. 2, 2019

(54) ROTOR MEMBER, ROTOR AND ELECTRIC MOTOR

(71) Applicant: FANUC CORPORATION, Yamanashi (JP)

(72) Inventor: Youhei Arimatsu, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 210 days.

(21) Appl. No.: 15/584,410

(22) Filed: May 2, 2017

(65) Prior Publication Data

US 2017/0373548 A1 Dec. 28, 2017

(30) Foreign Application Priority Data

Jun. 24, 2016 (JP) .................................. 2016-125082

(51) Int. Cl.
| | |
|---|---|
| H02K 1/27 | (2006.01) |
| H02K 1/28 | (2006.01) |
| H02K 7/00 | (2006.01) |
| H02K 21/14 | (2006.01) |
| H02K 5/128 | (2006.01) |

(52) U.S. Cl.
CPC .............. *H02K 1/27* (2013.01); *H02K 1/278* (2013.01); *H02K 1/28* (2013.01); *H02K 21/14* (2013.01); *H02K 7/003* (2013.01); *H02K 2005/1287* (2013.01)

(58) Field of Classification Search
CPC ............ H02K 1/278; H02K 1/28; H02K 1/30; H02K 7/003
USPC ............ 310/156.08, 156.09, 156.12, 156.13, 310/156.14, 156.28, 216.121, 216.123
See application file for complete search history.

(56) References Cited

U.S. PATENT DOCUMENTS

| | | | | |
|---|---|---|---|---|
| 2012/0326555 | A1* | 12/2012 | Arimatsu | H02K 1/30 |
| | | | | 310/216.121 |
| 2013/0113324 | A1 | 5/2013 | Shepard et al. | |
| 2014/0300233 | A1 | 10/2014 | Arimatsu | |
| 2015/0145365 | A1* | 5/2015 | Fujii | H02K 1/276 |
| | | | | 310/156.01 |

(Continued)

FOREIGN PATENT DOCUMENTS

| | | |
|---|---|---|
| JP | 2000-023399 A | 1/2000 |
| JP | 2000-245086 A | 9/2000 |
| JP | 2014-212680 A | 11/2014 |

OTHER PUBLICATIONS

An Office Action mailed by the Japanese Patent Office dated May 29, 2018, which corresponds to Japanese Patent Application No. 2016-125082 and is related to U.S. Appl. No. 15/584,410.

*Primary Examiner* — Quyen P Leung
*Assistant Examiner* — Minki Chang
(74) *Attorney, Agent, or Firm* — Studebaker & Brackett PC

(57) ABSTRACT

In a rotor member fixed by press-fitting to a rotary shaft part of an electric motor, the inner circumferential face of a sleeve part has an inner circumferential tapered face in which the inside diameter of the sleeve part continuously increases at a fixed ratio in a direction from a first end towards a second end. In addition, an outer circumferential face of the sleeve part has an outer circumferential tapered face in which the outside diameter of the sleeve part continuously decreases at a fixed ratio in a direction from the first end towards the second end in an axial-direction segment of the sleeve part in which at least the inner circumferential tapered face is present.

3 Claims, 6 Drawing Sheets

(56) References Cited

U.S. PATENT DOCUMENTS

2015/0364960 A1* 12/2015 Arimatsu ............... H02K 1/278
310/156.28

* cited by examiner

ROTOR MEMBER, ROTOR AND ELECTRIC MOTOR

This application is based on and claims the benefit of priority from Japanese Patent Application No. 2016-125082, filed on 24 Jun. 2016, the content of which is incorporated herein by reference.

BACKGROUND OF THE INVENTION

Field of the Invention

The present invention relates to a rotor member, a rotor and an electric motor, and in particular, relates to a rotor member constituting a magnet surface-bonded type electric motor, a rotor and an electric motor including these.

Related Art

The rotor member of a synchronous motor includes a cylindrical sleeve part; and a plurality of magnet segments (permanent magnets) arranged so as to be aligned in the circumferential direction at the outer side in the radial direction of the sleeve part, and as a whole constituting a cylindrical magnet segment group. The inner circumferential face of the sleeve part has a tapered face. In the space surrounded by the inner circumferential face of the sleeve part of such a rotor member, a rotary shaft part having a cylindrical shape is inserted by press-fitting, whereby the rotor of the electric motor is configured.

In the case of rotating a synchronous electric motor having such a rotor, it is necessary to conduct some kind of reinforcing in the fixing of the magnet segments so as to be able to sufficiently endure the centrifugal force during rotation of the rotor. Generally, a reinforced structure is adopted such as by covering the magnet segments with a retaining member that is configured from carbon fiber or glass fiber, or a non-magnetic metal such as titanium, for example. More specifically, for example, in a synchronous electric motor of high-speed application, the magnet segments are sandwiched between a sleeve part and a cylindrical member serving as a retaining member of carbon fiber reinforced plastic (CFRP) covering the outer circumferential faces of the magnet segments (refer to Patent Document 1).

Patent Document 1: Japanese Unexamined Patent Application, Publication No. 2014-212680

SUMMARY OF THE INVENTION

With the rotor of the synchronous electric motor described in the above-mentioned Patent Document 1, the taper rate of the inner circumferential face of the sleeve part and the taper rate of the outer circumferential face of a rotary shaft part abutting against this inner circumferential face are the same. Upon manufacture of the rotor of such a synchronous electric motor described in the above-mentioned Patent Document 1, the work for assembling the cylindrical member serving as the retaining member to the outer circumferential faces of the magnet segments is not easy.

Prioritizing the ease of assembly, for example, if forming a gap between the cylindrical member and magnet segments and performing assembly by so-called loose fitting, this gap as is becomes a pointless diameter increase in the sleeve part. In addition, it comes to pointlessly increase the pressure (tonnage) during press-fitting, and has been considered to raise the problem of the sleeve part breaking, and the problem of disassembly difficulty. In addition, at a stage at which the rotor member has been assembled, which is a prior to the rotor being assembled, it is considered that problems arise in that the rotor member is not fixed and will move or fall off. This is particularly a problem in the case of a motor of built-in-type in which the rotor member is handled as a separate item.

Conversely, if trying to interference-fit without a gap between the cylindrical member and magnet segments, upon the cylindrical member being fit with the outer circumferential face of the magnet segment, problems have been considered in that the press-fitting force increases due to the friction area increasing as the press-fitting progresses, and the cylindrical member is no longer pressed in the middle of press-fitting, or if continued pressing is not possible, the cylindrical member itself cannot withstand this press-fitting force and is destroyed.

In particular, in a case of the shape of the outer circumferential face of the magnet segment group in a cross-section orthogonal to the shaft center of the magnet segment group not being a perfect circle, and the shape of the inner circumferential face of the cylindrical member in a cross-section orthogonal to the shaft center of the cylindrical shaft being formed in a perfectly circular cylindrical shape, upon assembling by covering the outer circumferential face of the magnet segments with the cylindrical member, work is necessary to deform the cylindrical member by some kind of method in advance to a form matching the shape of the outer circumferential faces of the magnet segments consisting the magnet segment group, and then fit together. However, with this work, problems are considered in that precision is demanded in deformation and has a high degree of difficulty, and thus requires man-hours.

In addition, as another method, a method has been considered of using a cylindrical member in which the shape of the inner circumferential face of the cylindrical member is made into a shape imitating the shape of the outer circumferential face of the magnet segments. However, in the case of this method, it is necessary to finish the inner circumferential face shape of the cylindrical member with high dimensional accuracy in order to configure so as not to impart a wasteful amount of diameter increase to the sleeve part. It is possible to reduce the wasteful amount of diameter increase of the sleeve part more with higher precision finishing. However, in finishing with such high precision, there are problems in that the degree of difficulty in manufacture is high, and the cost rises.

The present invention has an object of providing a rotor member, a rotor and an electric motor having these, which are capable of facilitating assembling of a cylindrical member to the outer circumferential face of a magnet segment upon manufacturing the rotor member, suppressing a diameter increase of a sleeve part, and reliably fixing the cylindrical member to the sleeve part.

A rotor member (for example, the rotor member 300, 300A described later) according to the present invention which is fixed by press-fitting to a rotary shaft part (for example, the rotary shaft part 200 described later) of an electric motor (for example, the electric motor 100 described later), includes: a cylindrical sleeve part (for example, the sleeve part 301 described later) having a first end (for example, the first end 302 described later) at an axial-direction first side thereof, and a second end (for example, the second end 303 described later) at an axial-direction second side thereof; a plurality of magnet segments (for example, the magnet segment 311 described later) that are arranged to align in a circumferential direction at an outer side in the radial direction of the sleeve part; and a cylindrical member that covers the plurality of the magnet segments from an outer side in the radial direction, and sandwiches the plurality of the magnet segments with the sleeve part, in which an inner circumferential face of the sleeve part has an inner circumferential tapered face (for example, the tapered inner circumferential face 306 described later) in which the inside diameter of the sleeve part continuously increases at a fixed ratio in a direction from the first end towards the second end, and an outer circumferential face of the sleeve part has an outer circumferential tapered face (for example, the tapered outer circumferential face 304 described later) in which the outside diameter of the sleeve part continuously decreases at a fixed ratio in a direction from the first end towards the second end, in an axial-direction segment of the sleeve part in which at least the inner circumferential tapered face is present.

In addition, according to the present invention, a rotor of an electric motor includes: the above-mentioned rotor member; and a rotary shaft part that is press-fit to the sleeve part of the rotor member, in which a portion of the outer circumferential face of the rotary shaft part, which is a portion at which the inner circumferential tapered face of the sleeve part abuts when the rotary shaft part is press-fitted to the sleeve part, has an outer circumferential tapered face (for example, the tapered outer circumferential face 202 described later) at which the outside diameter of the rotary shaft part continuously increases at a fixed ratio in a direction from the first end towards the second end, and in which, in the rotor member in a state prior to the rotary shaft part being press-fit to the sleeve part, when defining a taper rate of the inner circumferential tapered face of the sleeve part of the rotor member as t1, defining a taper rate of the outer circumferential tapered face of the sleeve part of the rotor member as t2, and in the rotary shaft part in a state prior to the rotary shaft part being press-fit to the sleeve part, defining a taper rate of the outer circumferential tapered face of the rotor member of the rotor as t3, the rotor has a relationship of t1+t2=t3. Furthermore, an electric motor according to the present invention includes the above-mentioned rotor.

According to the present invention, it is possible to provide a rotor member, a rotor and an electric motor having these, which are capable of facilitating assembling of a cylindrical member to the outer circumferential face of a magnet segment upon manufacturing the rotor member, suppressing a diameter increase of a sleeve part, and reliably fixing the cylindrical member to the sleeve part.

DETAILED DESCRIPTION OF THE INVENTION

Figure 1:
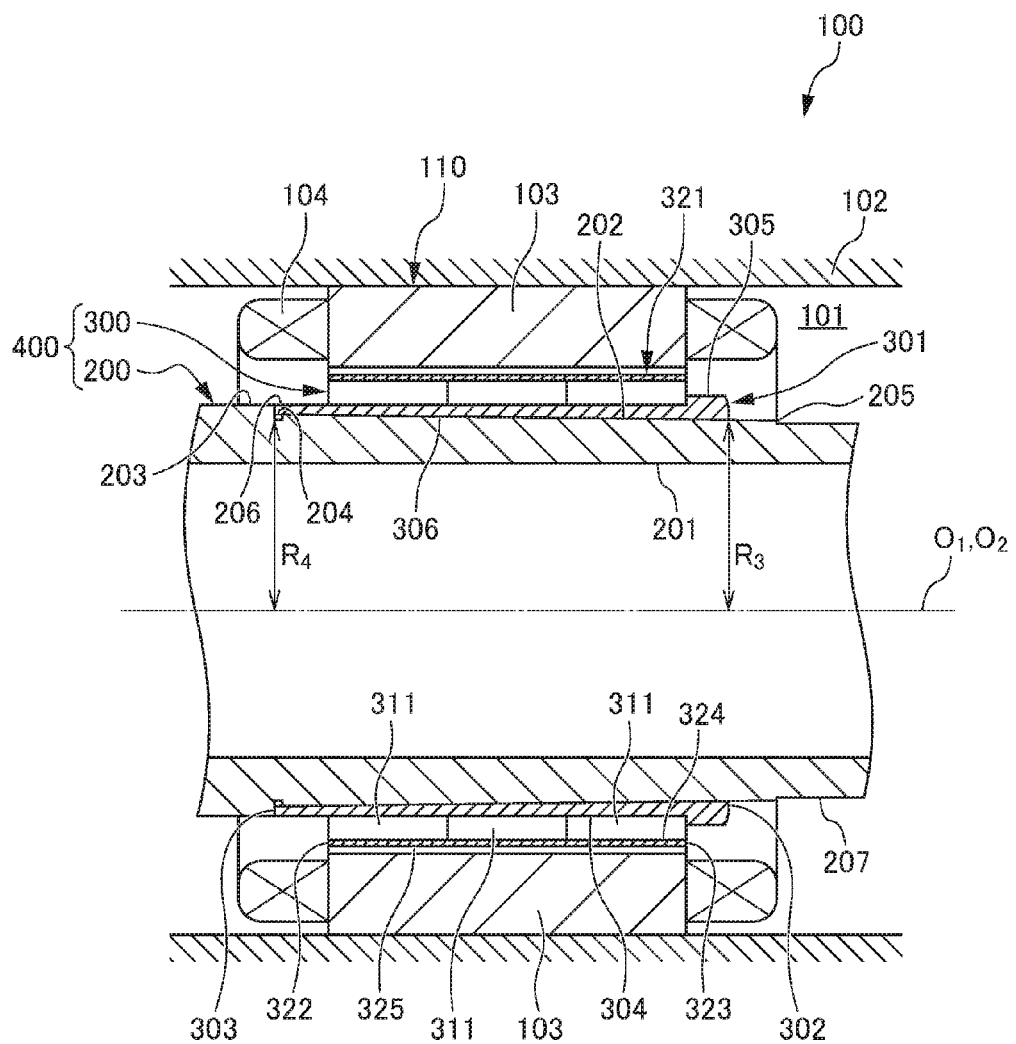
FIG. 1 is a cross-sectional view showing an electric motor 100 according to a first embodiment.
Figure 2:
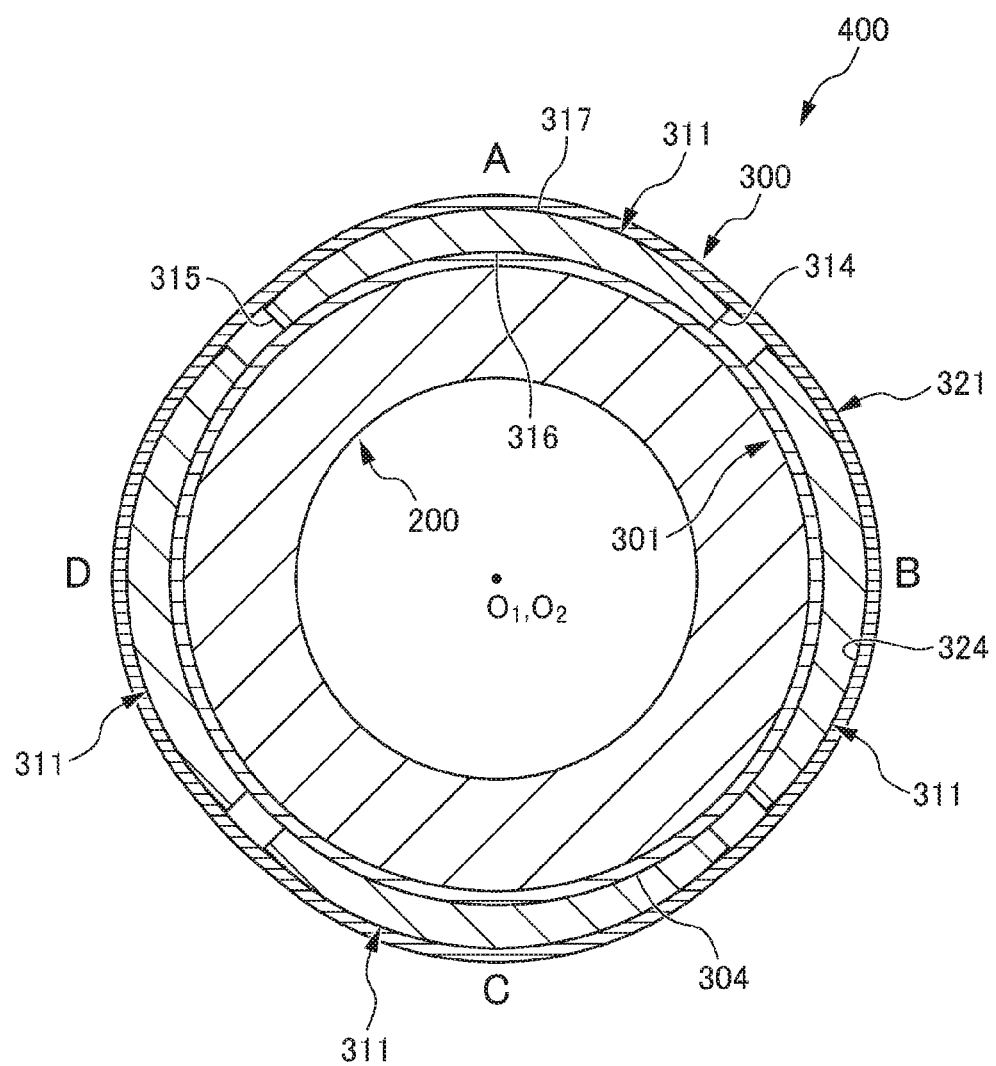
FIG. 2 is a cross-sectional view seen in an axial direction of a sleeve part 301, showing a rotor 400 according to the first embodiment.
Figure 3:
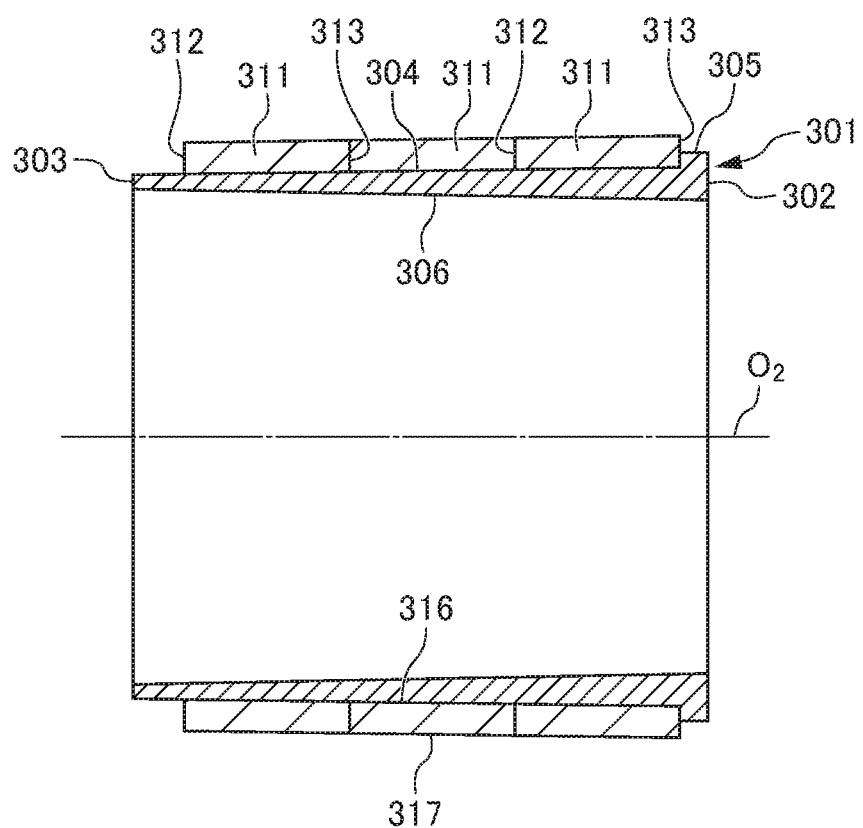
FIG. 3 is a cross-sectional view cutting a plane including a shaft center of the sleeve part 301, showing a rotor member 300 according to the first embodiment.

Hereinafter, a first embodiment of the present invention will be explained. FIG. 1 is a cross-sectional view showing an electric motor 100 according to the first embodiment. FIG. 2 is a cross-sectional view seen along the axial direction of a sleeve part 301, showing a rotor 400 according to the first embodiment. FIG. 3 is a cross-sectional view cutting a plane including a shaft center of the sleeve part 301, showing a rotor member 300 according to the first embodiment. In the following explanation, for convenience in explanation, the direction along the shaft center of a rotary shaft part 200 of the electric motor 100 is defined as the axial direction, and in FIG. 1, the left direction is defined as forward in the axial direction, and right direction as rearward in the axial direction.

The electric motor 100 as a rotating electrical machine is configured by a synchronous motor, and includes a housing 102 that forms an internal space 101, a stator 110 that is arranged to be stationary in the internal space 101 of the housing 102, and a rotor 400 that is rotatably installed at an inner side in the radial direction of the stator 110. The stator 110 has a stator core 103, and a coil 104 wound around the stator core 103. The stator core 103 is produced by thin sheets of electromagnetic steel being laminated.

A power wire (not illustrated) electrically connected to the coil 104 is drawn from the stator 110. The power wire is connected to a power source (not illustrated) that is installed outside of the electric motor 100, via a through hole provided in the housing 102.

The rotor 400 has a rotary shaft part 200 that extends in the axial direction of the internal space 101, and a rotor member 300 that is fixed to the outer side in the radial direction of the rotary shaft part 200.

The rotary shaft part 200 is a cylindrical member having a shaft center (center axis line) $O_1$, and a center hole 201 that is concentric with the shaft center $O_1$, as shown in FIG. 1, etc. In the present embodiment, due to assuming a built-in-motor used in the spindle of a machine tool as the electric motor 100, the center hole 201 is formed at the rotary shaft part 200; however, it is not limited thereto. The rotary shaft part 200 may be made with a solid member in which the center hole 201 is not formed.

The shaft center $O_1$ of the rotary shaft part 200 is the rotating shaft center of the electric motor 100. A portion on the forward side in the axial direction of the rotary shaft part 200 is rotatably supported by the housing 102, via a bearing (not illustrated) installed in a wall part on the forward side of the housing 102. Similarly, a portion on the rearward side in the axial direction of the rotary shaft part 200 is rotatably supported by the housing 102, via a bearing (not illustrated) installed in the wall part on the rearward side of the housing 102.

The rotary shaft part 200 has a tapered outer circumferential face 202. The tapered outer circumferential face 202 is a portion of the outer circumferential face of the rotary shaft part 200, and when the rotary shaft part 200 is press-fit to the sleeve part 301, is positioned at the outer circumferential face of the rotary shaft part 200 abutted by the tapered outer circumferential face 202 described later. In a state prior to the rotary shaft part 200 being press-fit to the sleeve part 301, the tapered outer circumferential face 202 has a taper rate t3. The value of the taper rate t3 is on the order of 1/100, for example. A portion 203 on the forward side in the axial direction of the rotary shaft part 200 and a stepped part 204 are provided for convenience during production. The tapered outer circumferential face 202 extends continuously from a axial-direction back end 205 to an axial-direction front end 206. The outer circumferential face 207 of the cylindrical shape extending linearly along the axial direction is formed rearward in the axial direction of the axial-direction back end 205 in the tapered outer circumferential face 202.

The thrust portion 203 and the stepped part 204 are formed in order to facilitate an assembly operation during production. The thrust portion 203 has an outer circumferential face of cylindrical shape extending along the axial direction, and projects from the tapered outer circumferential face 202 to an outer side in the radial direction of the rotary shaft part 200, so as to form the stepped part 204 with the axial-direction front end 206 of the tapered outer circumferential face 202.

As shown in FIG. 2, etc., the rotor member 300 has a cylindrical sleeve part 301, a plurality of magnet segments 311 which are arranged so as to align in the circumferential direction at the outer side in the radial direction of the sleeve part 301, and constitute a cylindrical magnet segment group as a whole, and a cylindrical member 321 which covers the magnet segments 311 from the outer side in the radial direction. The magnet segment 311 may be divided into a plurality in the axial direction according to the convenience of manufacture or convenience of molding of magnets, and in the present embodiment, are divided into three in the axial direction, as shown in FIG. 3.

As shown in FIG. 1, the sleeve part 301 is a cylindrical member having a shaft center (central shaft line) $O_2$. The sleeve part 301 has a first end 302 at the rearward side in the axial direction as an axial-direction first side, a second end 303 at the forward side in the axial direction as an axial-direction second side, and a tapered outer circumferential face 304 and tapered inner circumferential face 306 extending along the axial direction. A convex part 305 at the back end in the axial direction of the sleeve part 301 that projects to the outer side in the radial direction from the tapered outer circumferential face 304 is formed in order to facilitate aligning the position in the axial direction of magnets upon production.

The sleeve part 301 is prepared from metallic material that is a magnetic substance, like SS400 or S45C, for example. In addition, the thickness of the sleeve part 301 in the radial direction of the sleeve part 301 is preferably thinner in order to simplify the work to press-fit the sleeve part 301 into the rotary shaft part 200. For example, the sleeve part 301 has a thickness of 1 mm to 2 mm at a portion at which the thickness is thinnest.

As shown in FIG. 3, in the tapered inner circumferential face 306 serving as an inner circumferential taper face, the inside diameter of the sleeve part 301 continuously increases at a fixed ratio in a direction from the first end 302 towards the second end 303. The tapered inner circumferential face 306 extends continuously from the first end 302 to the second end 303, and does not include a portion in which the inside diameter of the sleeve part 301 decreases discontinuously from the axial-direction rearward side first end 302 until the axial-direction forward side second end 303. In other words, in the tapered inner circumferential face 306, the radius of the tapered inner circumferential face 306 gradually increases as approaching forwards in the axial direction of the sleeve part 301, over the entire region from the first end 302 to the second end 303.

The tapered inner circumferential face 306 constitutes a tapered face of taper rate t1 having a value smaller than the taper rate t3, in a state after the magnet segment 311 and cylindrical member 321 are imposed to the sleeve part 301 and the rotor member 300 is assembled, which is a state prior to the rotary shaft part 200 being press-fit to the sleeve part 301 of the rotor member 300. A portion in which the radius of the tapered inner circumferential face locally decreases does not exist at a midway portion of the tapered inner circumferential face 306 from the first end 302 to the second end 303.

In addition, the outer circumferential face of the sleeve part 301 has, in an axial-direction segment in which the tapered inner circumferential face 306 exists, a tapered outer circumferential face 304 serving as an outer circumferential tapered face in which the outside diameter of the sleeve part 301 continuously decreases at a fixed ratio in a direction from the first end 302 towards the second end 303. The tapered outer circumferential face 304 extends continuously from a front end of a convex part 305 until the second end 303, and does not include a portion in which the outside diameter of the sleeve part 301 discontinuously increases from the front end of the convex part 305 at an axial-direction rearward side until the second end 303 at an axial-direction forward side. In other words, the tapered outer circumferential face 304 has a radius that gradually decreases as approaching forwards in the axial direction, over the entire region from the front end of the convex part 305 until the second end 303.

The tapered outer circumferential face 304 constitutes a tapered face of taper rate t2 having a value smaller than the taper rate t3, in a state prior to the rotary shaft part 200 being press-fit to the sleeve part 301. A portion in which the radius of the tapered outer circumferential face 304 locally increases does not exist at a midway portion from the first end 302 until the second end 303. The taper rates t1, t2 and t3 have the relationship of t1+t2=t3.

In the electric motor 100, the sleeve part 301 is fixed on the tapered outer circumferential face 202 of the rotary shaft part 200, so that the shaft center $O_1$ of the rotary shaft part 200 and the shaft center $O_2$ of the sleeve part 301 match. The second end 303 of the sleeve part 301 and the stepped part 204 of the thrust portion 203 are abutting. The radius $R_4$ of the tapered inner circumferential face 306 at the second end 303 and the radius of the tapered outer circumferential face 202 at the axial-direction front end 206 are substantially equal. In addition, the radius $R_3$ of the tapered inner circumferential face 306 of the first end 302, and the radius of the tapered outer circumferential face 202 at which the tapered inner circumferential face 306 of the first end 302 abuts, which is a portion in the vicinity of the axial-direction back end 205, are substantially equal. The tapered inner circumferential face 306 of the sleeve part 301 and the tapered outer circumferential face 202 of the rotary shaft part 200 closely attach together with great surface pressure. The sleeve part 301 is pushes towards the outer side in the radial direction of the sleeve part 301 by way of the rotary shaft part 200.

The magnet segment 311 is configured by substantially arc-shaped magnet piece having an inside diameter of a predetermined radius of curvature. More specifically, the magnet segment 311 has an end face 312 at the forward side in the axial direction and end face 313 at the rearward side in the axial direction; an end face 314 at one side in the circumferential direction of the magnet segment group, and an end face 315 at the other side in the circumferential direction of the magnet segment group; and an inner circumferential face 316 at the inner side in the radial direction, and an outer circumferential face 317 at the outer side in the radial direction, as shown in FIGS. 2, 3, etc.

The inner circumferential face 316 is an arc face having a predetermined radius of curvature, and extends along the axial direction of the magnet segment group so as to connect a side forming the end face 312 which is at the inner side in the radial direction of the magnet segment group, and a side forming the end face 313, which is at the inner side in the radial direction of the magnet segment group. The outer circumferential face 317 is configured by a smooth curved line extending along the circumferential direction of the magnet segment group. A portion at an end of the magnet segment 311 in the circumferential direction of the magnet segment group is configured with thinning thickness as approaching the edge, so that the outer circumferential face 317 approaches the inner circumferential face 316, as shown in FIG. 2, etc.

As shown in FIGS. 1 and 2, the cylindrical member 321 is a member of cylindrical shape having a form that extends in the axial direction. More specifically, the cylindrical member 321 has an end face 322 at the axial-direction forward side, an end face 323 at the axial-direction rearward side, and an inner circumferential face 324 and outer circumferential face 325 of the cylindrical member 321. The cylindrical member 321 does not have a perfectly circular cylindrical shape, but rather has a non-circular cylindrical shape in which the radius becomes smaller compared to other portions of the cylindrical member 321, as shown in FIG. 2, etc., at a portion facing the space between a plurality of magnet segments 311 which are adjacent in the circumferential direction of the magnet segment group, and the vicinity thereof.

The cylindrical member 321 is able to slightly stretch in the circumferential direction of the cylindrical member 321, has high strength relative to deformation that would swell toward the outer side in the radial direction, and thus the radius (diameter) of the cylindrical member 321 hardly changes. In addition, the cylindrical member 321 is preferably manufactured from a non-magnetic material from the viewpoint of preventing heat generation from magnetic flux and a performance decline due to leakage of magnetic flux. Furthermore, the cylindrical member 321 preferably has low density in order to lower the centrifugal force produced from rotation.

For example, as the material of the cylindrical member 321, materials superior in specific strength (tensile strength per unit density) are ideal such as carbon fiber, glass fiber, aramid fiber, silicon carbide fiber, boron fiber, titanium alloy fiber, ultrahigh molecular weight polyethylene fiber, or polybutylene terephthalate fiber are ideal. In addition, as the material of the cylindrical member 321, FRP (fiber reinforced resin) made using carbon fiber, glass fiber, aramid fiber, silicon carbide fiber, boron fiber, titanium alloy fiber, ultrahigh molecular weight polyethylene fiber, or polybutylene terephthalate fiber, or a composition made by combining several of these are also ideal. In addition, as the material of the cylindrical member 321, a non-magnetic metal such as Austenitic stainless steel, titanium, or titanium alloy may be used. In the present embodiment, CFRP (carbon fiber reinforced resin) is used as the material of the cylindrical member 321.

As is evident from FIGS. 1 and 2, twelve of the magnet segments 311 are arranged on the tapered outer circumferential face 304 of the sleeve part 301 of the rotor member 300. More specifically, at the position in the circumferential direction of the magnet segment group indicated by A in FIG. 2, three of the magnet segments 311 are arranged so as to be adjoining in the axial direction of the magnet segment group. Similarly, at positions in the circumferential direction of the magnet segment group indicated by B, C and D in FIG. 2, three of the magnet segments 311 are arranged so as to be adjoining in the axial direction of the magnet segment group.

As mentioned earlier, the tapered outer circumferential face 304 of the sleeve part 301 constitutes a tapered face of taper rate t2 having a value smaller than the taper rate t3, in a state prior to the rotary shaft part 200 being press-fit to the sleeve part 301. For this reason, the outer circumferential face 317 of the magnet segment 311 constitutes a tapered face of taper rate t2 along the axial direction of the magnet segment group in relation to this axial direction. In the magnet segment group of cylindrical shape, the outer circumferential face 317 of the magnet segment 311 will thereby have the largest outside diameter at the right end of the magnet segment 311 arranged the rightmost shown in FIG. 4, and have the smallest outside diameter at the left end of the magnet segment 311 that is arranged the leftmost shown in FIG. 4.

In this way, in the rotor member 300 according to the present embodiment, six pairs of magnet segments 311 are disposed so as to be arranged at substantially equal intervals in the circumferential direction of the sleeve part 301, on the tapered outer circumferential face 304 of the sleeve part 301. Each of the magnet segments 311 positioned at the axial-direction rearward side is arranged to align positions in the axial direction, by a structure such as the convex part 305 being provided to the sleeve part 301, for example, as shown in FIG. 1, etc.

At the outer side in the radial direction of the magnet segment group consisting of six pairs of, for a total of twelve, magnet segments 311 in the circumferential direction of the sleeve part 301, the cylindrical member 321 is provided so as to cover as well as tighten the entirety of the magnet segments 311 from the outer side in the radial direction of the sleeve part 301. The maximum value for the inside diameter of the cylindrical member 321 has substantially the same length as the length from one outer circumferential face 317 of the magnet segment 311 until another outer circumferential face 317 through the center of the rotor 400, at a diameter of the rotor 400 passing through the thickest portion of the magnet segment 311 in the circumferential direction of the magnet segment group.

Then, as mentioned above, the sleeve part 301 is pressed towards the outer side in the radial direction of the sleeve part 301 by the rotary shaft part 200, in the electric motor 100 as shown in FIG. 1. By way of this pressing, the sleeve part 301 tries to deform to the outer side in the radial direction, and presses each of the magnet segments 311 towards the outer side in the radial direction of the magnet segment group.

In contrast, the cylindrical member 321 has high strength against deformation that would swell towards the outer side in the radial direction of the cylindrical member 321, as mentioned above. Therefore, the stress imparted from the magnet segments 311 is accepted by the tension of the cylindrical member 321 produced in the circumferential direction of the cylindrical member 321, and as the reaction force thereof, the magnet segment 311 is pushed back towards the inner side in the radial direction of the magnet segment group. For this reason, the magnet segment 311 is firmly sandwiched between the sleeve part 301 and the cylindrical member 321. Even in a case of the rotor member 300 rotating at high speed during driving of the electric motor 100, the magnet segments 311 will thereby be suppressed from relatively moving in relation to the sleeve part 301 and cylindrical member 321.

Next, operation of the electric motor 100 will be explained by referencing FIGS. 1, 2, etc. When current flows to the coil 104 from the power source installed outside of the electric motor 100 via a power line, a rotating field is generated around the shaft center $O_1$ by the rotor 110. The magnet segment 311 of the rotor member 300 receives the electromagnetic force in the circumferential direction of the magnet segment by way of the rotating field generated by the rotor 110. As a result thereof, the rotor member 300 rotates integrally with the rotor shaft part 200.

Figure 4:
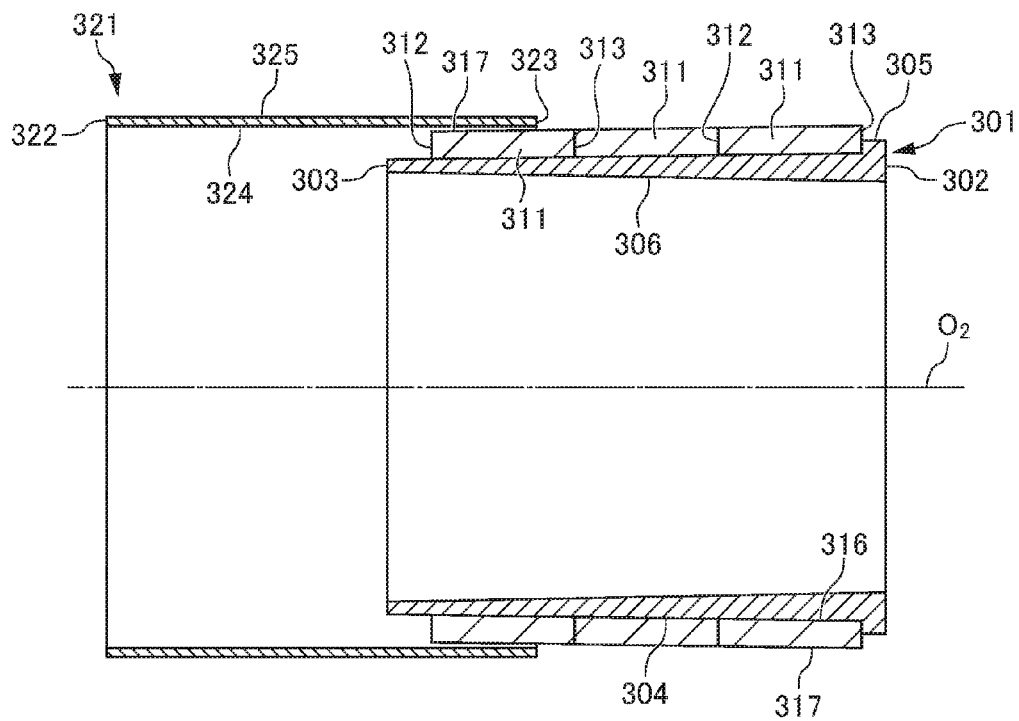
FIG. 4 is a cross-sectional view cutting a plane including the shaft center of the sleeve part 301, showing an aspect of assembling a cylindrical member 321 of the rotor member 300 according to the first embodiment to an outer circumferential face 317 of a magnet segment 311.
Figure 5:
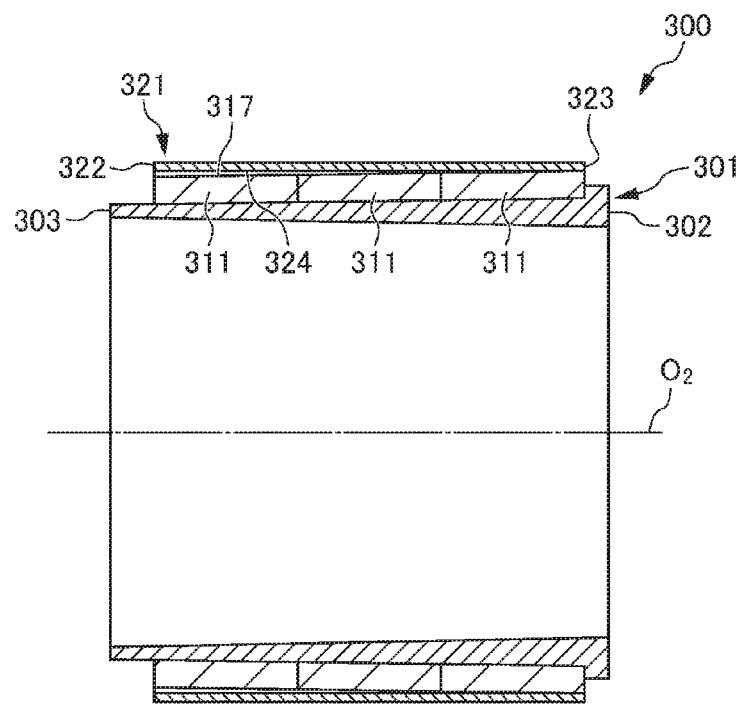
FIG. 5 is a cross-sectional view cutting a plane including the shaft center of the sleeve part 301, showing an aspect of the cylindrical member 321 of the rotor member 300 according to the first embodiment assembled to the outer circumferential face 317 of the magnet segment 311.

Next, assembly of the magnet segment 311 and the cylindrical member 321 to the sleeve part 301 in the manufacturing process of the rotor 400 will be explained by referencing FIGS. 4 and 5. FIG. 4 is a cross-sectional view cutting a plane including the shaft center of the sleeve part 301, showing an aspect of assembling the cylindrical member 321 of the rotor member 300 according to the first embodiment to the outer circumferential face 317 of the magnet segment 311. FIG. 5 is a cross-sectional view cutting a plane including the shaft center of the sleeve part 301, showing an aspect of the cylindrical member 321 of the rotor member 300 according to the first embodiment having been assembled to the outer circumferential face 317 of the magnet segment 311.

First, as shown in FIG. 4, the second end 303 of the sleeve part 301 in a state in which the magnet segments 311 are arranged on the tapered outer circumferential face 304 is inserted from the end face 323 rearward in the axial direction of the cylindrical member 321 into an internal space of the cylindrical member 321 which is surrounded by the inner circumferential face 324 of the cylindrical member 321. At this time, the maximum value of the inside diameter of the cylindrical member 321 is substantially equal to the outside diameter of a portion positioned the most to the back end of the magnet segment 311 as mentioned earlier, i.e. portion of the right end of the magnet segment 311 that is rightmost in FIG. 4, and is larger than the outside diameter of a portion on the left end of the magnet segment 311 that is the leftmost in FIG. 4; therefore, a slight gap is formed between the outer circumferential face 317 of the magnet segment 311 and the inner circumferential face 324 of the cylindrical member 321, at a position biased towards the front end.

Then, when the sleeve part 301 in a state in which the magnet segment 311 is arranged on the tapered outer circumferential face 304 is further inserted into the internal space of the cylindrical member 321, the inner circumferential face 324 of the cylindrical member 321 abuts the outer circumferential face 317 of the magnet segment 311, and the pressure required for insertion starts to generate. Furthermore, when the sleeve part 301 is inserted into the internal space of the cylindrical member 321, although the pressure required in press-fitting gradually increases, the inner circumferential face 324 of a portion near the end face 322 that is forward in the axial direction of the cylindrical member 321 will not contact the outer circumferential face 317 of the magnet segment 311. For this reason, the pressure required in order to insert the sleeve part 301 into the internal space of the cylindrical member 321 does not become so large a pressure. Then, by inserting the sleeve part 301 into the cylindrical member 321 until leading the end face 323 that is forward in the axial direction of the cylindrical member to the end face 313 of the magnet segment 311 that is rightmost in FIG. 4, insertion by press-fitting of the cylindrical member 321 to the internal space of the cylindrical member 321 is completed, as shown in FIG. 5. Also at this time, the end face 322 that is forward in the axial direction of the cylindrical member 321 and the inner circumferential face 324 at a portion in the vicinity thereof still do not contact the outer circumferential face 317 of the magnet segment 311.

Figure 6:
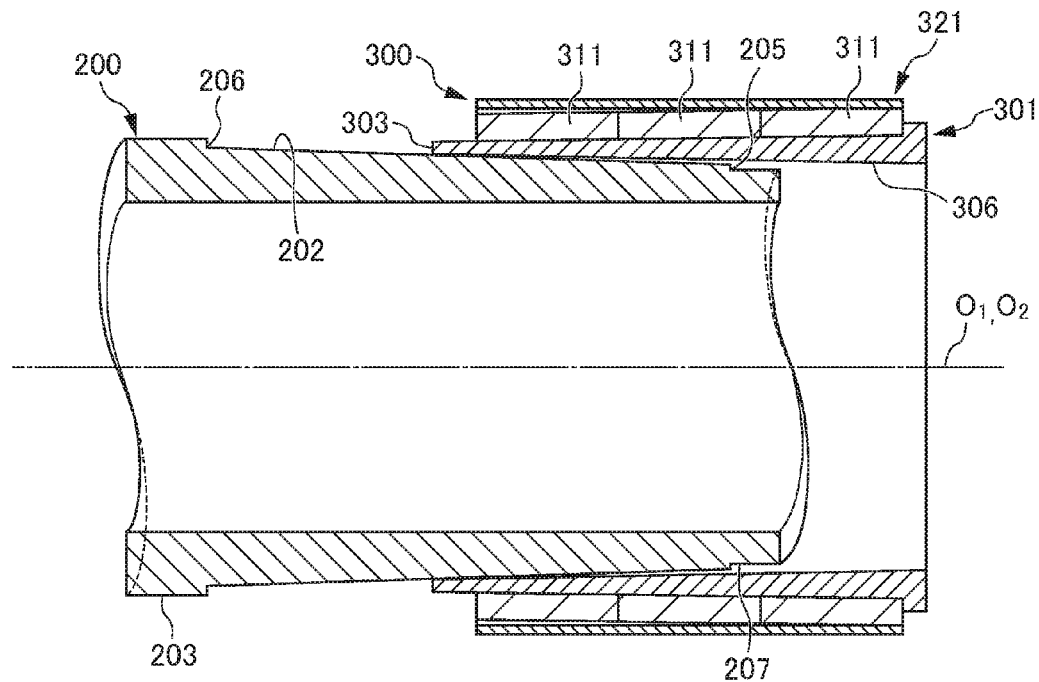
FIG. 6 is a cross-sectional view cutting a plane including the shaft center of the sleeve part 301, showing an aspect of inserting a rotor shaft part 200 into the sleeve part 301 of the rotor member 300 according to the first embodiment.
Figure 7:
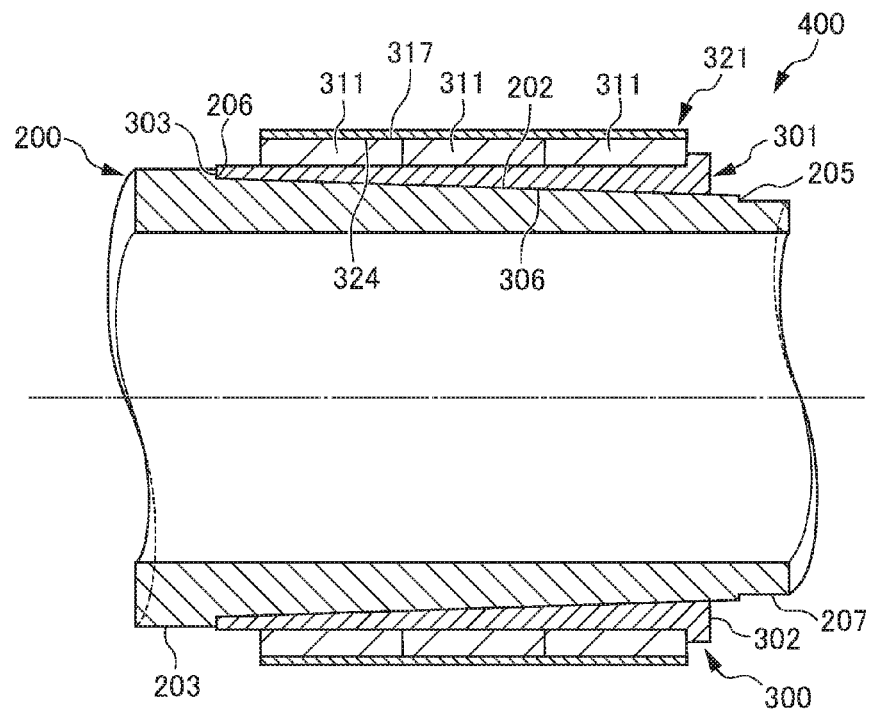
FIG. 7 is a cross-sectional view cutting a plane including the shaft center of the sleeve part 301, showing an aspect of the rotary shaft part 200 having been inserted into the sleeve part 301 of the rotor member 300 according to the first embodiment.

Next, assembly of the rotor member 300 to the rotary shaft part 200 in the manufacturing process of the rotor 400 will be explained by referencing FIGS. 6 and 7. FIG. 6 is a cross-sectional view cutting a plane including the shaft center of the sleeve part 301, showing an aspect of inserting the rotary shaft part 200 into the sleeve part 301 of the rotor member 300 according to the first embodiment. FIG. 7 is a cross-sectional view cutting a plane including the shaft center of the sleeve part 301, showing an aspect of the rotary shaft part 200 having been inserted into the sleeve part 301 of the rotor member 300 according to the first embodiment.

First, as shown in FIG. 6, the axial-direction back end 205 of the rotary shaft part 200 is inserted from the second end 303 of the sleeve part 301 into the internal space of the sleeve part 301, which is surrounded by the tapered inner circumferential face 306 of the sleeve part 301. At this time, the outside diameter of the rotary shaft part 200 at the tapered outer circumferential face 202 in the vicinity of the axial-direction back end 205 is smaller than the inside diameter formed by a portion of the tapered inner circumferential face 306 in a portion of the sleeve part 301 (portion from the axial-direction front end of the sleeve part 301) other than the axial-direction back end of the sleeve part 301; therefore, a slight gap is formed between the tapered outer circumferential face 202 of the rotary shaft part 200 and the tapered inner circumferential face 306 of the sleeve part 301, at a position biased to the right end of the rotary shaft part 200 shown in FIG. 6.

Then, when the rotary shaft part 200 is further inserted into the sleeve part 301, the tapered outer circumferential face 202 of the rotary shaft part 200 abuts the tapered inner circumferential face 306 in the vicinity of the first end 302 of the sleeve part 301, and the pressure required for insertion starts to generate. Furthermore, when inserting the rotary shaft part 200 into the sleeve part 301, although the pressure required for insertion gradually increases, a portion of the sleeve part 301 in the vicinity of the second end 303 still does not contact the tapered outer circumferential face 202 of the rotary shaft part 200. For this reason, the pressure in order to insert the rotary shaft part 200 into the internal space of the sleeve part 301 does not become so large a pressure. Then, the rotary shaft part 200 is inserted into the sleeve part 301 until the axial-direction back end 205 of the rotary shaft part 200 projects rearward from the first end 302 of the sleeve part 301, whereby insertion by the press-fitting of the rotary shaft part 200 to the sleeve part 301 is completed, as shown in FIG. 7.

At this time, since the taper rates t1, t2 and t3 have the relationship of $$t1+t2=t3$$

prior to insertion of the rotary shaft part 200 to the sleeve part 301, it enters a state in which the tapered inner circumferential face 306 of the sleeve part 301 surface butts the tapered outer circumferential face 202 of the rotary shaft part 200, and a gap is not formed between the tapered outer circumferential face 202 and the tapered inner circumferential face 306, as shown in FIG. 7. In addition, it enters a state in which the outer circumferential face 317 of the magnet segment 11 surface butts the inner circumferential face 324 of the cylindrical member 321, and a gap is not formed between the inner circumferential face 324 of the cylindrical member 321 and the outer circumferential face 317 of the magnet segment 311. In this state, the rotary shaft part 200 pushes the sleeve part 301 towards the outer side in the radial direction of the sleeve part 301, and the magnet segment 311 is sandwiched between the sleeve part 301 and cylindrical member 321.

In the above way, according to the present embodiment, the rotor member 300 fixed by press fitting to the rotary shaft part 200 of the electric motor 100 includes: the cylindrical sleeve part 301 having a first end 302 on an axial-direction first side and a second end 303 at an axial-direction second side; a plurality of the magnet segments 311 arranged so as to align in the circumferential direction at an outer side in the radial direction of the sleeve part 301, and as a whole constituting the cylindrical magnet segment group; and the cylindrical member 321 that covers the plurality of magnet segments 311 from the outer side in the radial direction of the magnet segment group, and sandwiches the plurality of magnet segments 311 with the sleeve part 301. The inner circumferential face of the sleeve part 301 has a tapered inner circumferential face 306 serving as an inner circumferential tapered face in which the inside diameter of the sleeve part 301 continuously increases at a fixed ratio in a direction from the first end 302 towards the second end 303. The outer circumferential face of the sleeve part 301 has the tapered outer circumferential face 304 serving as the outer circumferential tapered face in which the outside diameter of the sleeve part 301 continuously decreases at a fixed ratio in a direction from the first end 302 toward the second end 303, in an axial-direction segment of the sleeve part 301 in which the tapered inner circumferential face 306 exists.

Since the tapered outer circumferential face 304 of the sleeve part 301 is a tapered shape, the outer circumferential face 317 of the magnet segment 311 at the moment prior to inserting the rotary shaft part 200 by way of press-fitting to the sleeve part 301 thereby also assumes a tapered shape along the shaft line of the sleeve part 301 imitating this.

As a result thereof, when inserting the sleeve part 301 on which the magnet segments 311 are arranged into the internal space of the cylindrical member 321 by way of press-fitting, it is possible to decrease the surface area of the inner circumferential face 324 of the cylindrical member 321 sliding on the outer circumferential face 317 of the magnet segment 311, and thus is done without raising the pressure related to press-fitting. For this reason, the work of assembling the cylindrical member 321 to the sleeve part 301 on which the magnet segments 311 are arranged becomes easy. For this reason, upon assembling the cylindrical member 321 to the sleeve part 301 on which the magnet segments 311 are arranged, it is possible to decrease or avoid the risk of damaging the cylindrical member 321 by way of excessive press-fitting force.

In addition, in the rotor 400 of the electric motor 100 having the rotor member 300 and rotary shaft part 200 press fit to the sleeve part 301 of the rotor member 300, a portion of the outer circumferential face of the rotary shaft part 200, which is a portion at which the tapered inner circumferential face 306 of the sleeve part 301 abuts when the rotary shaft part 200 is press-fit to the sleeve part 301, has a tapered outer circumferential face 202 serving as an outer circumferential tapered face in which the outside diameter of the rotary shaft part 200 continuously increases at a fixed ratio in a direction from the first end 302 towards the second end 303. In the rotor member 300 in a state prior to the rotary shaft part 200 being press-fit to the sleeve part 301, when defining the taper rate of the tapered inner circumferential face 306 serving as the inner circumferential tapered face of the sleeve part 301 of the rotor member 300 as t1, defining the taper rate of the tapered outer circumferential face 304 serving as the outer circumferential tapered face of the sleeve part 301 of the rotor member 300 as t2, and defining the taper rate of the tapered outer circumferential face 202 of the rotary shaft part 200 of the rotor 400 in the rotary shaft part 200 in a state prior to the rotary shaft part 200 being press-fit to the sleeve part 301 as t3, it has the relationship of t1+t2=t3.

The taper rate t1 of the tapered inner circumferential face 306 of the sleeve part 301 at the moment prior to the rotor member 300 being fixed to the rotary shaft part 200 and the taper rate t3 of the tapered outer circumferential face 202 of the rotary shaft part 200 thereby differ. For this reason, when the rotary shaft part 200 is assembled to the sleeve part 301, it becomes possible to configure so that gaps formed between the outer circumferential face 317 of the magnet segment 311 and the inner circumferential face 324 of the cylindrical member 321, and between the tapered outer circumferential face 202 of the rotary shaft part 200 and the tapered inner circumferential face 306 of the sleeve part 301 are no longer offset. It thereby becomes possible for the outer circumferential face 317 of the magnet segment 311 of the rotor member 300 to be made parallel to the shaft line direction of the rotary shaft part 200, after the rotor member 300 is press-fit to a predetermined position on the rotary shaft part 200, and installation on the rotary shaft part 200 has completed. As a result thereof, the rotor 400 manufactured becomes able to be made a rotor of the same shape as a conventionally.

Figure 8:
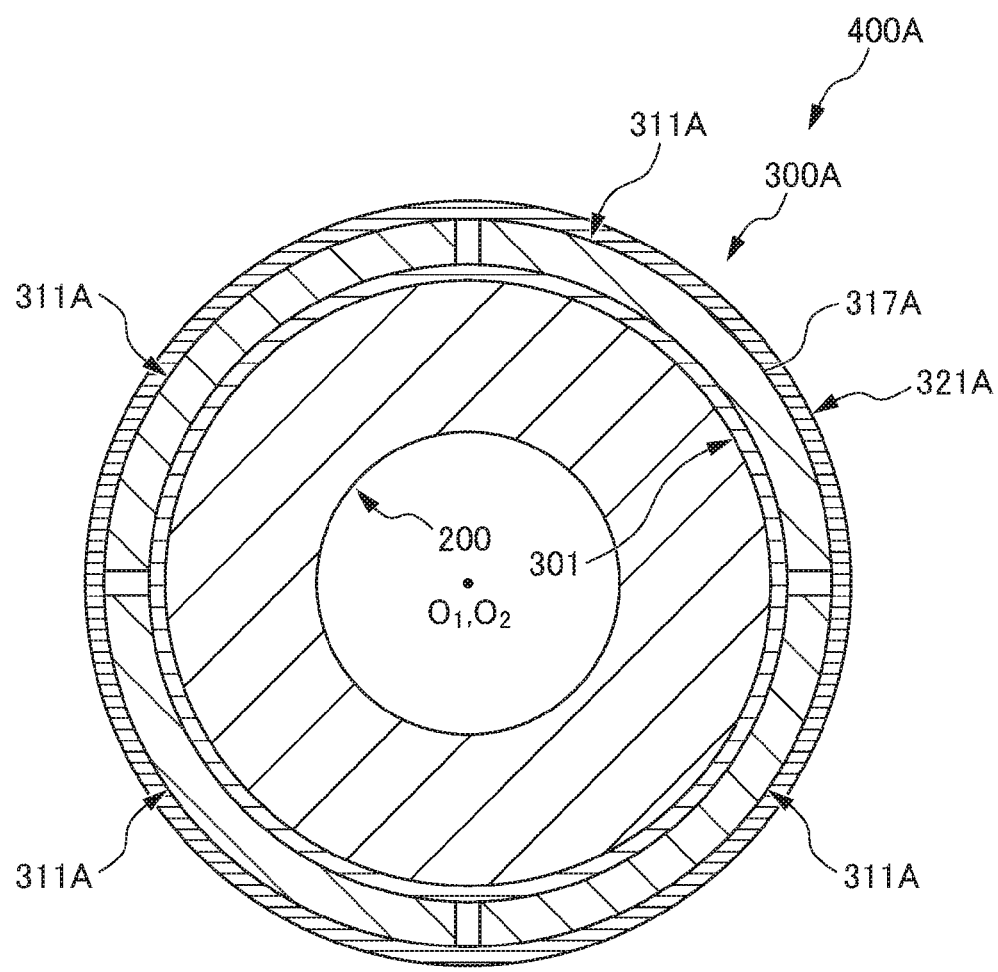
FIG. 8 is a cross-sectional view seen in the axial direction of the sleeve part 301, showing a rotor 400A according to a second embodiment.

Next, a rotor member according to a second embodiment of the present invention will be explained while referencing FIG. 8. FIG. 8 is a cross-sectional view seen in the axial direction of the sleeve part 301, showing a rotor 400A according to the second embodiment.

In the rotor member 300A of the rotor 400A according to the second embodiment, the configuration of a magnet segment 311A differs from the configuration of the magnet segment 311 according to the first embodiment. In addition, the configuration of a cylindrical member 321A differs from the configuration of the cylindrical member 321 according to the first embodiment. Since the configuration other than this is similar to the configuration of the rotor member 300 of the rotor 400 according to the first embodiment, a similar reference symbol is assigned for configurations similar to the respective configurations of the first embodiment, and explanations thereof are omitted.

A portion at an end of the magnet segment 311A in the circumferential direction of the magnet segment group is a constant thickness even when approaching the edge, as shown in FIG. 8. In other words, at any position in the circumferential direction of the magnet segment group, the thickness of the magnet segment 311A in the radial direction of the magnet segment group is constant.

The cylindrical member 321A has a perfectly circular cylindrical shape in which the inside diameter and outside diameter are respectively constant, in an axial-direction segment from an end face at a front side in the axial direction until an end face at a rear side in the axial direction of the cylindrical member 321A (corresponding to from the end face 322 forward in the axial direction until the end face 323 rearward in the axial direction of the cylindrical member 321 of the first embodiment). The inside diameter of the cylindrical member 321A has substantially the same length as the length of the diameter of the rotor 400A from one outer circumferential face 317 of the magnet segment 311 until another outer circumferential face 317 passing through the center of the rotor 400A.

Although embodiments of the present invention have been explained above, the present invention is not to be limited to the aforementioned embodiments. In addition, the effects described in the present embodiments are merely listing the most preferred effects produced from the present invention, and the effects according to the present invention are not to be limited to those described in the present embodiments.

For example, the configurations of the rotor member, rotor and electric motor having these are not limited to the configurations of the rotor member 300, 300A, rotor 400, 400A and electric motor 100 having these of the present embodiments. For example, although twelve of the magnet segments 311 are provided, it is not limited to this number. In addition, the magnet segment may not be divided in the axial direction of the magnet segment group. Furthermore, it is sufficient so long as the outer circumferential face of the sleeve part has an outer circumferential tapered face in which the outside diameter of the sleeve part continuously decreases at a fixed ratio in a direction from the first end towards the second end, in an axial-direction segment of the sleeve part in which at least the inner circumferential tapered face exists. Moreover, although the taper rate t1, taper rate t2 and taper rate t3 have the relationship of t1+t2=t3, it is not limited thereto.

EXPLANATION OF REFERENCE NUMERALS 100 electric motor (rotating electrical machine)
200 rotary shaft part
202 tapered outer circumferential face
300, 300A rotor member
301 sleeve part
302 first end
303 second end
304 tapered outer circumferential face
306 tapered inner circumferential face
311 magnet segment
321, 321A cylindrical member
400, 400A rotor
t1, t2, t3 taper rate

What is claimed is:

1. A rotor member which is fixed by press-fitting to a rotary shaft part of an electric motor, the rotor member comprising:
a cylindrical sleeve part having a first end at an axial-direction first side thereof, and a second end at an axial-direction second side thereof;
a plurality of magnet segments that are arranged to align in a circumferential direction at an outer side in the radial direction of the sleeve part; and
a cylindrical member that covers the plurality of the magnet segments from an outer side in the radial direction, and sandwiches the plurality of the magnet segments with the sleeve part,
wherein an inner circumferential face of the sleeve part has an inner circumferential tapered face in which the inside diameter of the sleeve part continuously increases at a fixed ratio in a direction from the first end towards the second end, and
wherein an outer circumferential face of the sleeve part has an outer circumferential tapered face in which the outside diameter of the sleeve part continuously decreases at a fixed ratio in a direction from the first end towards the second end, in an axial-direction segment of the sleeve part in which at least the inner circumferential tapered face is present,
wherein, in the rotor member in a state prior to the rotary shaft part being press fit into the sleeve part, an outer circumferential face of a plurality of the magnet segments has an outer circumferential tapered face in which an outside diameter of the rotating shaft part continuously decreases at a fixed ratio in a direction from the first end towards the second end, and a gap is formed between the outer circumferential face of the plurality of the magnet segments and the inner circumferential face of the cylindrical member, and
wherein, in the rotor member in a state after the rotary shaft part is press fit into the sleeve part, a gap is not formed between the outer circumferential face of the plurality of the magnet segments and the inner circumferential face of the cylindrical member, and the outer circumferential face of the plurality of the magnet segments and the inner circumferential face of the cylindrical member make surface contact.

2. A rotor of an electric motor comprising:
the rotor member according to claim 1; and
a rotary shaft part that is press-fit to the sleeve part of the rotor member,
wherein a portion of the outer circumferential face of the rotary shaft part, which is a portion at which the inner circumferential tapered face of the sleeve part abuts when the rotary shaft part is press-fitted to the sleeve part, has an outer circumferential tapered face at which the outside diameter of the rotary shaft part continuously increases at a fixed ratio in a direction from the first end towards the second end, and
wherein, in the rotor member in a state prior to the rotary shaft part being press-fit to the sleeve part,
when defining a taper rate of the inner circumferential tapered face of the sleeve part of the rotor member as t1,
defining a taper rate of the outer circumferential tapered face of the sleeve part of the rotor member as t2, and
in the rotary shaft part in a state prior to the rotary shaft part being press-fit to the sleeve part,
defining a taper rate of the outer circumferential tapered face of the rotary shaft part of the rotor as t3,
the rotor has a relationship of t1+t2=t3.

3. An electric motor comprising the rotor according to claim 2.

* * * * *